United States Patent
Shochet et al.

(10) Patent No.: US 10,786,737 B2
(45) Date of Patent: Sep. 29, 2020

(54) LEVEL EDITOR WITH WORD-FREE CODING SYSTEM

(71) Applicant: codeSpark, Inc., Pasadena, CA (US)

(72) Inventors: Joseph Adrian Shochet, Canyon Country, CA (US); Grant Alexander Hosford, IV, La Canada, CA (US); Joseph Warren France, Alhambra, CA (US); Chris Damian Avellis, Sun Valley, CA (US); Win Kang, Pasadena, CA (US)

(73) Assignee: CODESPARK, INC., Pasadena, CA (US)

( * ) Notice: Subject to any disclaimer, the term of this patent is extended or adjusted under 35 U.S.C. 154(b) by 222 days.

(21) Appl. No.: 15/346,494

(22) Filed: Nov. 8, 2016

(65) Prior Publication Data

US 2018/0126276 A1    May 10, 2018

(51) Int. Cl.
   *A63F 13/63* (2014.01)
   *A63F 13/45* (2014.01)
   *A63F 13/47* (2014.01)
   *A63F 13/2145* (2014.01)

(52) U.S. Cl.
   CPC .............. *A63F 13/63* (2014.09); *A63F 13/45* (2014.09); *A63F 13/2145* (2014.09); *A63F 13/47* (2014.09); *A63F 2300/6018* (2013.01)

(58) Field of Classification Search
   None
   See application file for complete search history.

(56) References Cited

U.S. PATENT DOCUMENTS

| | | | | |
|---|---|---|---|---|
| 5,377,997 A * | 1/1995 | Wilden | ............. | A63F 13/10 463/43 |
| 5,577,185 A * | 11/1996 | Tunnell | ............. | A63F 13/10 345/473 |
| 5,592,609 A * | 1/1997 | Suzuki | ............. | A63F 13/10 345/473 |
| 5,680,534 A * | 10/1997 | Yamato | ............. | A63F 13/10 345/473 |
| 5,760,788 A * | 6/1998 | Chainini | ............. | G06F 8/34 345/474 |

(Continued)

OTHER PUBLICATIONS

Klik & Play, Europress Software, see Wayback Machine dated Sep. 16, 2011, https://web.archive.org/web/20110916043616/http://jnoodle.com/ps_2/ws6.html.*

(Continued)

*Primary Examiner* — Tramar Y Harper
(74) *Attorney, Agent, or Firm* — Brinks Gilson & Lione

(57) ABSTRACT

Systems and methods are provided for video game development. The system may include a level editor that configures a level of a video game in response to user input, where the level represents a physical space comprising game objects, a character is moveable within the physical space in response to input received from the game controller when the video game is played, and the level has an objective for the character to complete. The system may include a word-free code editor with which any item of the level is programmable with software code. When the video game is played, a game engine may control the programmed items according to the software code and move the character within the level in response to the user input received from the game controller.

20 Claims, 10 Drawing Sheets

(56) References Cited

U.S. PATENT DOCUMENTS

| | | | | |
|---|---|---|---|---|
| 6,292,170 | B1* | 9/2001 | Chang | G06F 3/011 |
| | | | | 345/156 |
| 6,340,977 | B1* | 1/2002 | Lui | G06F 9/453 |
| | | | | 715/709 |
| 7,594,182 | B2* | 9/2009 | King | G06F 9/542 |
| | | | | 715/700 |
| 7,746,343 | B1* | 6/2010 | Charaniya | G06F 3/04815 |
| | | | | 345/428 |
| 8,128,500 | B1* | 3/2012 | Borst | A63F 13/335 |
| | | | | 446/268 |
| 8,365,086 | B2* | 1/2013 | Grace | G06F 8/38 |
| | | | | 715/771 |
| 8,397,172 | B2* | 3/2013 | Kodosky | G05B 19/0426 |
| | | | | 715/762 |
| 9,164,576 | B2* | 10/2015 | Gehani | G06F 8/38 |
| 2002/0130894 | A1* | 9/2002 | Young | G06F 3/04817 |
| | | | | 715/706 |
| 2003/0058238 | A1* | 3/2003 | Doak | A63F 13/63 |
| | | | | 345/419 |
| 2005/0202862 | A1* | 9/2005 | Shuman | A63F 13/10 |
| | | | | 463/9 |
| 2007/0162854 | A1* | 7/2007 | Kikinis | A63F 13/10 |
| | | | | 715/719 |
| 2008/0078758 | A1* | 4/2008 | Shimura | A63F 13/12 |
| | | | | 219/717 |
| 2008/0113327 | A1* | 5/2008 | Larcheveque | G09B 19/00 |
| | | | | 434/350 |
| 2008/0163055 | A1* | 7/2008 | Ganz | G06Q 30/02 |
| | | | | 715/706 |
| 2009/0253517 | A1* | 10/2009 | Bererton | A63F 13/63 |
| | | | | 463/42 |
| 2011/0173587 | A1* | 7/2011 | Detwiller | G06F 8/20 |
| | | | | 717/109 |
| 2012/0324385 | A1* | 12/2012 | Johnston | G06T 13/80 |
| | | | | 715/765 |
| 2013/0326467 | A1* | 12/2013 | Nair | G06F 11/3664 |
| | | | | 717/101 |
| 2016/0294813 | A1* | 10/2016 | Zou | H04L 63/0815 |
| 2016/0306785 | A1* | 10/2016 | Sebastian | A63F 13/655 |
| 2016/0321159 | A1* | 11/2016 | Romm | G06F 11/364 |
| 2017/0277519 | A1* | 9/2017 | Lee | G06F 8/34 |

OTHER PUBLICATIONS

"Kodable gets kids programming before they can read" by Erin Carson, Oct. 20, 2014, https://www.techrepublic.com/article/kodable-gets-kids-programming-before-they-can-read/.*

Blockly Games, retrieved from the Internet Nov. 8, 2016, pp. 1-2, Blockly-games.appspot.com, available at URL: https://blockly-games.appspot.com/about?iang=en.

Blocksworld, retrieved from the Internet on Nov. 8, 2016, pp. 1-16, play.blocksworld.com, available at URL: https://play.blocksworld.com/.

Cargo-Bot -iPad, retrieved from the Internet on Nov. 8, 2016, pp. 1-3, twolivesleft.com, available at URL: http://twolivesleft.com/CargoBot.

Carry on Learning: Robo logic LE, retrieved from the Internet on Nov. 8, 2016, pp. 1-5, carryonlearning.blogspot.com, available at URL: http://carryonlearning.blogspot.com/2014/12/robo-logic-le.html.

CodeCombat, retrieved from the Internet on Nov. 8, 2016, pp. 1-7, codecombat.com, available at URL: https://codecombat.com/about.

Code Kingdoms—Learn how to build your own Minecraft mods in Java, retrieved from the Internet on Nov. 8, 2016, pp. 1-10, codekingdoms.com, available at URL: https://codekingdoms.com/.

CodeMonkey, retrieved from the Internet on Nov. 8, 2016, pp. 1-9, playcodemonkey.com, available at URL: https://www.playcodemonkey.com/.

Geometry Dash, retrieved from the Internet on Nov. 8, 2016, pp. 1-12, en.softonic.com, available at URL: https://geometry-dash-en-softonic.com/.

Hopscotch—Learn to Code Through Creative Play, retrieved from the Internet on Nov. 8, 2016, pp. 1-6, gethopscotch.com, available at URL: https://www.gethopscotch.com/about-us.

Kodable: Programming Curriculum for Elementary, retrieved from the Internet on Nov. 8, 2016, pp. 1, kodable.com, available at URL: https://www.kodable.com/.

Kodu Game Lab Tutorial—How to Make a Game—retrieved from the Internet on Nov. 8, 2016, pp. 1, youtube.com, available at URL: https://www.youtube.com/watch?v=eZ5EVicSOU0.

Lightbot, retrieved from the Internet on Nov. 8, 2016, pp. 1-3, lightbot.com, available at URL: https://lightbot.com.

LittleBigPlanet, retrieved from the Internet on Nov. 8, 2016, pp. 1-2, littlebigplanet.playstation.com, available at URL: http://littlebigplanet.playstation.com/about.

Move the Turtle—Programming for Kids on the iPhone and iPad, retrieved from the Internet on Nov. 8, 2016, pp. 1-3, movetheturtle.com, available at URL: http://movetheturtle.com.

Game Wizard—Pixel Press, retrieved from the Internet on Nov. 8, 2016, pp. 1-10, projectpixelpress.com, available at URL: http://www.projectpixelpress.com/adventure-time-game-wizard/.

Roblox.com, retrieved from the Internet on Nov. 8, 2016, pp. 1-4, roblox.com, available at URL: https://www.roblox.com/.

Scratch—Imagine, Program, Store, retreived from the Internet on Nov. 8, 2016, pp. 1, scratch.mit.edu, available at URL: https://scratch.mit.edu/about.

Story in Scratch Jr, retrieved from the Internet on Nov. 8, 2016, pp. 1, youtube.com, available at URL: https://youtu.be/-qB-rEjV28M.

Super Mario Maker™ for Wii U—Official Site, retrieved from the Internet on Nov. 8, 2016, pp. 1-3, supermariomaker.nintendo.com, available at URL: http://supermariomaker.nintendo,com/.

Supernauts—Join the builders of the future!, retrieved from the Internet on Nov. 8, 2016, pp. 1-7, supernauts.com, available at URL: http://supernauts.com/.

Tynker—Coding for Kids, retrieved from the Internet on Nov. 8, 2016, pp. 1-6, tynker.com, available at URL: https://www.tynker.com/.

* cited by examiner

LEVEL EDITOR WITH WORD-FREE CODING SYSTEM

TECHNICAL FIELD

This disclosure relates to a software development system and, in particular, to a system with a level editor and a word-free coding system.

BACKGROUND

An integrated development environment (IDE) is a software application that includes features that computer programmers may use to develop software. An IDE typically comprises a source code editor, a build automation tool, and a debugger to help locate defects in software. An IDE usually supports programming in one or more programming languages.

The computer programmer may take courses to learn a programming language supported by the IDE. The computer programmer may then develop software written in the programming language using the IDE.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

In some examples, a system for video game development may be provided that is suitable for children as young as four years old with no prior programming experience or knowledge. The system may include a level editor, a word-free code editor, and a game engine. The level editor may configure a level of a video game in response to user input. The level represents a physical space comprising game objects, where a character is moveable within the physical space in response to input received from a game controller when the video game is played. For example, the level may be a two-dimensional space that scrolls left or right as the character is moved left or right. The two-dimensional space may represent three dimensions, but the character may be limited to movement in two dimensions. Alternatively, the level may be a three-dimensional space. The level has an objective for the character to complete when the video game is played. For example, the character may have to navigate from left to right and eventually reach a gold star in order to complete the level. The word-free code editor may generate software code in response to user input. For example, the word-free code editor may enable a user to associate a command with a game object by selecting the game object and dragging a command block, which represents the command, from a code library into a sequence bar. The software code that is generated may control the character and/or the game objects. For example, the command block may have an animated icon that visually shows an icon jumping. By dragging the command block into the sequence bar, the selected game object may be programmed to jump. The game engine, when the game is played, may move the character within the level in response to the input received from the game controller, control the game objects according to the generated software code, and complete the level when the objective for the character is met.

One interesting feature of the innovative systems and methods described herein may be that such systems and methods enable children as young as four years with no prior programming experience or knowledge to develop video games without the help of an adult. Alternatively, or in addition, an interesting feature of the systems and methods described herein may be that such systems and methods enable anyone who has not yet learned to read to develop video games. Alternatively, or in addition, an interesting feature of the systems and methods described herein may be that such systems and methods enable very young children, any non-reader, and/or any person with reading challenges or difficulties such as dyslexia to learn software programming concepts. Because of some users' interest in video games, the systems and methods may encourage, in some examples, the users to learn software programming concepts without the users even realizing they are learning to program.

Figure 1:
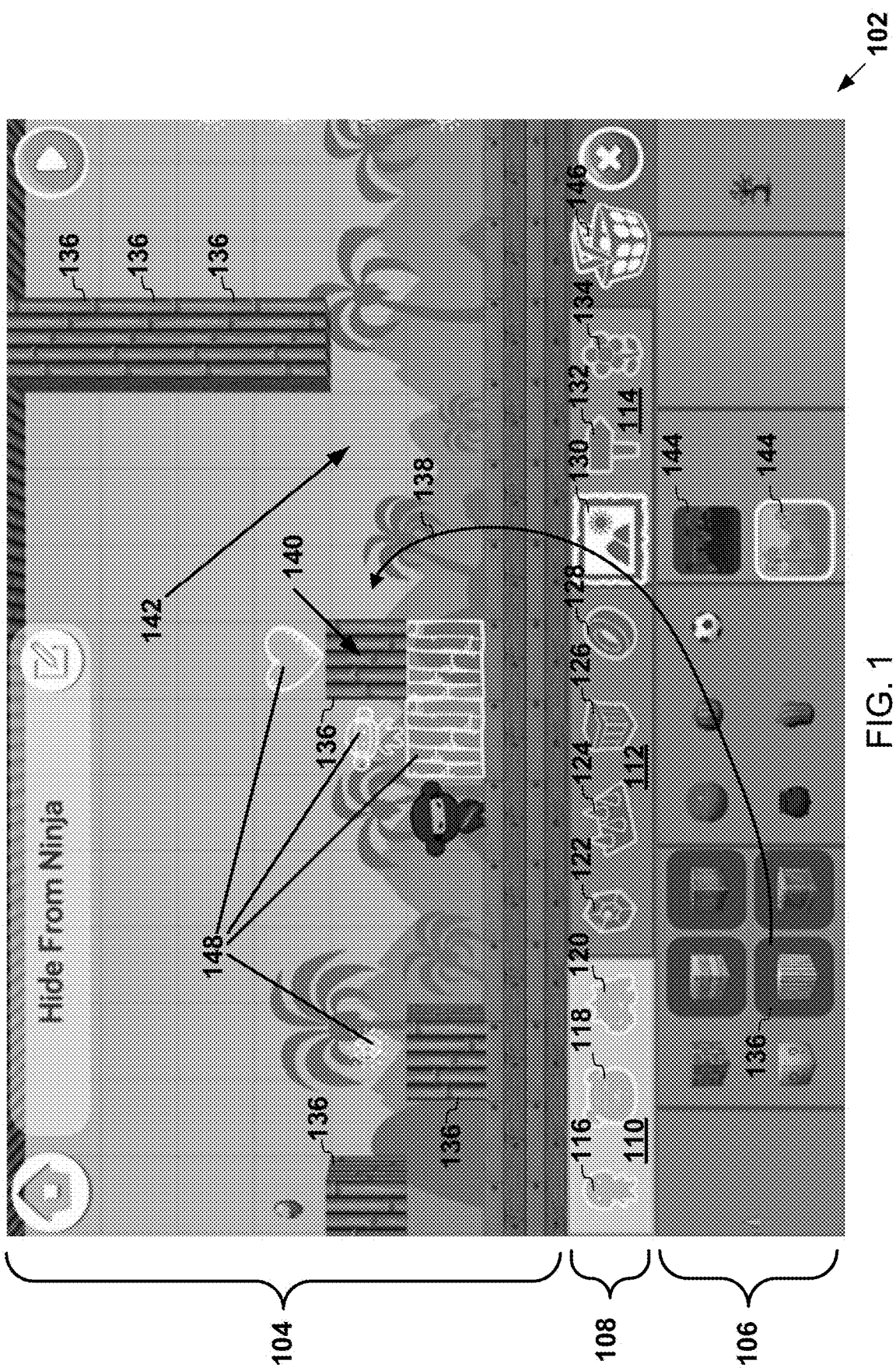
FIG. 1 illustrates an example of a graphical user interface generated by a level editor.

FIG. 1 illustrates an example of a graphical user interface (GUI) 102 generated by a level editor. The level editor GUI 102 may be displayed, for example, if the system for video game development is in edit mode. The GUI 102 may display the level 104 to be edited. The GUI 102 may display an inventory 106 of game objects that may be added to the level 104. The GUI 102 may include a graphical menu 108 that includes tabs, 110, 112, and 114, which are for corresponding types of game objects. For example, the first tab 110 in the illustrated example is for avatars 116, pets 118, and enemies 120. The second tab 112 is for collectables 122, traps 124, blocks 126, and props 128. The third tab is for backgrounds 130, signs 132, and stickers 134. Other examples of the GUI 102 may include additional, fewer, or different tabs. In some examples, the GUI 102 may not include any tabs.

As shown in FIG. 1, the graphical menu 108 may include icons on each tab representing the types of game objects in the inventory 106 that are selectable when the tab is active. For example, an icon representing a typical specimen of each of the collectables 122, the traps 124, the blocks 126, and the props 128 is shown on the second tab 112 shown in FIG. 1. As a result, no words are needed to convey the use of the tabs 110, 112, and 114 to a person using the level editor.

Game objects that are in the inventory 106 and that are of the type(s) represented on a selected tab may be displayed in the GUI 102. Any displayed game object in the inventory 106, such as a bamboo block 136, may be added to the level 104 by dragging and dropping 138 the game object from the inventory 106 to a target location 140 in the level 104.

Alternatively or in addition, a game object in the inventory 106 may be selected by tapping or clicking the game object, and then tapping or clicking at the target location 140 in the level 104, thereby adding the selected game object to the level 104 at the target location 140. A background 142 for the level 104 may be selected from a group of backgrounds 144 in the inventory 106. For example, a visual representation of each background in the group of backgrounds 144 to choose from may be displayed in the GUI 102. The visual representation of the desired one of the backgrounds 144 may be include, for example, a thumbnail image and/or an icon. Alternatively or in addition, the background 142 may be selected by dragging and dropping the visual representation from the inventory 106 to the level 104.

In some examples, a game object may be added to the inventory 106 by purchasing the game object in a virtual store (not shown). The virtual store may be accessed from the level editor by, for example, clicking a shop button 146. The virtual store may be part of an incentive system described further below. In the virtual store, the entire set of possible game objects and commands may be available. The inventory 106 available to build the level 104 may be shown, for example, in colored trays at a bottom of the GUI 102. The items shown in the inventory 106 may have been unlocked or purchased by the user.

Blueprints 148 may be included in the GUI 102 in some examples. The blueprints may suggest to the user where to place one or more game objects in the level 104 in order to configure the level 104. Each of the blueprints 148 may be shown in the GUI 102 using an outline, a shadow, or any other indicator of the type of game object that is suggested by the blueprint. The indicator of the type of game object may be positioned in a location where the game object is to be placed by the user. The suggested game objects and locations indicated by the blueprints 148 may be mere suggestions and may not be required in order to create the level 104. The blueprints 148 may help young players understand where to place game objects.

Figure 2:
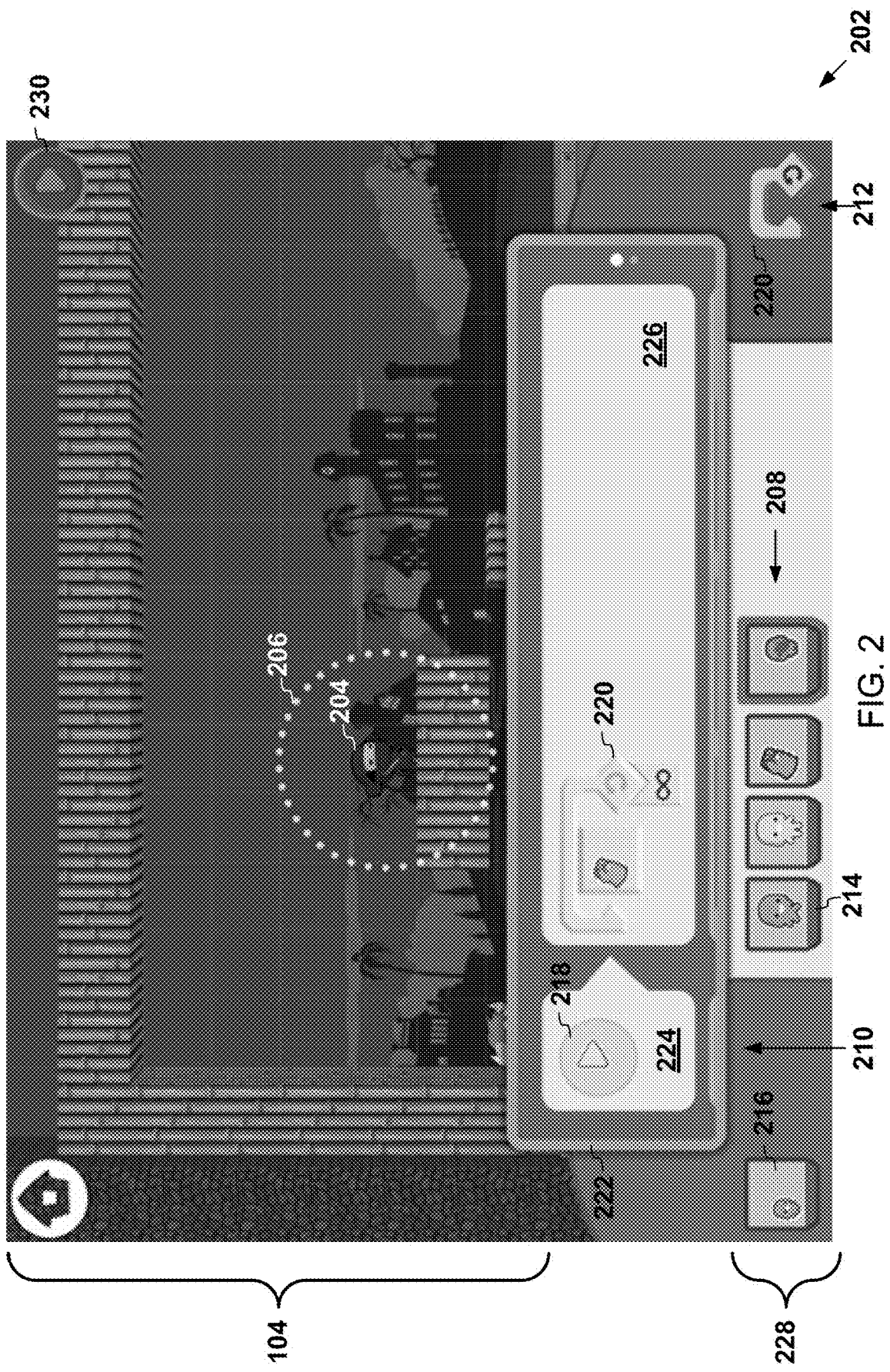
FIG. 2 illustrates an example of a code editor graphical user interface generated by a word-free code editor.

FIG. 2 illustrates an example of a code editor graphical user interface (GUI) 202 generated by a word-free code editor. A user may program the behavior of any selected item 206 in the level 104 with the word-free code editor. The selected item 206 may be a character 204 or any game object. The character 204 is moveable within the level 104 in response to input received from a game controller when the video game is played. Examples of the game object are provided above. The code editor GUI 202 may be displayed, for example, if the system for video game development is in edit mode.

The word-free code editor may be a block-based code editor. In a block-based code editor, commands 208 are represented as blocks. In addition, other programming constructs, such as events 210 and/or control structures 212, may be represented by blocks in some block-based code editors.

Each of the commands 208 represents an action that may be taken by an item programmed with the command. For example, a command may be a run command 214 that is represented by a block having an animated icon, where the animated icon shows a running motion. Examples of the commands 208 may include any type of command, such as jump, walk, transform, special effects, spawn object, and disappear. The transform command, when executed, may cause the programmed item to transform into a different type of item. The special effects command may cause the programmed item to exhibit a special effect, such as glow, emits sparks. The spawn object command may cause a new item to be generated. The disappear command may cause the programmed item to disappear from the level 104.

In some examples, the commands 208 may include one or more commands that are specific to an object being programmed. For example, the character 204 illustrated in FIG. 2 is a ninja who has an ability to grow and/or shrink. A grow and/or shrink command 216 may be represented by a block having an icon of an object that repeatedly shrinks and grows.

Each of the events 210 may be any occurrence that may trigger code to execute. Examples of the events 210 may include a play event 218, a bump event (not shown), and a hear event (not shown). The play event 218 occurs if the video game is started. The play event 218 may be represented by a visual indication, such as a play button icon. Each additional event may be represented by a corresponding visual indication. The visual indications of the events may be provided in a code editor field 222 of the GUI 202. In FIG. 2, the visual indications of the additional events may be viewed by scrolling down the code editor field 222. The bump event occurs if a programmed game objects contacts another game object. The visual indication of the bump event may be, for example, an animation of two objects coming into contact with each other. The hear event occurs if a message is heard, in others received. The message may be sent by a message command, for example. In the example illustrated in FIG. 2, a play button 230 may be pressed by the user to switch out of edit mode and begin playing the video game that includes the level 104. Hear event-code runs when a message is heard (message is sent by a specific command Each of the control structures 212 may determine a flow of execution of code. Examples of the control structures 212 may include a loop structure 220 and a conditional structure. The loop structure 220 may be represented by an icon indicating a looping motion. The conditional structure may represent an if-then structure, a repeat-while structure, or any other conditional structure.

To program any item in the level 104, the item may be selected by, for example, tapping or clicking the item in the level 104. In response to the item being selected, the selected item 206 may be visually modified in the GUI 202 to indicate that the item is selected. For example, the selected item 206 may be encircled with a dotted line.

Software code associated with the selected item 206 may be displayed in the code editor field 222 of the GUI 202. Code constructs available to the user may be shown in a code library 228 portion of the GUI 202. The code editor field 222 is where the user may put software code when programming the selected item 206. The word-free code editor may also put software coded in the code editor field 222. For example, the word-free code editor may add the events 210 to the code editor field 222 that are relevant to the selected item 206.

Each line of code associated with the selected item 206 may be represented by an event box 224 and a sequence box 226 within the code editor field 222. As a user programs additional features for the selected item 206, multiple lines of code may be listed in the code editor field 222. Each line of code listed in the code editor field 222 may have a different event type than the other lines.

The word-free code editor may include the events 210 in the code editor field 222 that are relevant to the selected item 206. In alternative examples, the user may drag an event from the code library 228 to the event box 224. In response to the event in the event box 224 occurring, the code in the corresponding sequence box 226 executes. For example, because the play event 218 is in the event box 224, the code in the sequence box 226 will execute if the video game is later played.

The event box 224 may visually indicate to the user that if the event in the event box 224 were to occur, then execution of the commands in the sequence box 226 will be triggered. For example, the event box 224 may have an arrow shape that points toward the sequence box 226 as shown in FIG. 2.

The user may construct a sequence of commands to be executed in response to the selected event by dragging each of the commands 208, which is to be executed in the sequence, from the code library 228 to the sequence box 226. The commands in the sequence box 226 may be executed in an order in which the commands are arranged in the sequence box 226. For example, the commands may be executed in an order from left to right. The commands in the sequence box 226 may be placed in an order desired by the user and/or dragged and dropped into the desired order. If no commands are in the sequence box 226, then a default action (which may be no action) may be taken if the event in the event box 224 occurs.

If desired, the user may drag a control structure from the code library 228 to the sequence box 226. For example, the user may drag the loop structure 220 from the code library 228 to the sequence box 226. The user may resize the loop structure 220 to enclose additional, fewer, or different commands in the sequence box 226. The loop structure 220 may cause the commands enclosed by the loop structure 220 to execute a number of iterations. For example, the user may drag one end of the loop structure 220 to enclose additional or fewer commands that are in the sequence box 226. The user may set an iteration count of the loop structure 220 to a particular number of iterations or to an infinite number of iterations in some examples.

The game objects may come with default code that can be changed by the user. The default may enable the user to easily create a video game without requiring the user to program any of the game objects.

As explained above, code constructs that are available to the user may be shown in the code library 228. The code constructs, such as the commands 208 that are available to the user, may include code constructs that have been earned and unlocked by the user through completion of puzzles and game kits. A game kit may be a template game. Each game kit may include, for example, a set of blueprints, a set of commands, and/or a set of game objects.

Figure 3:
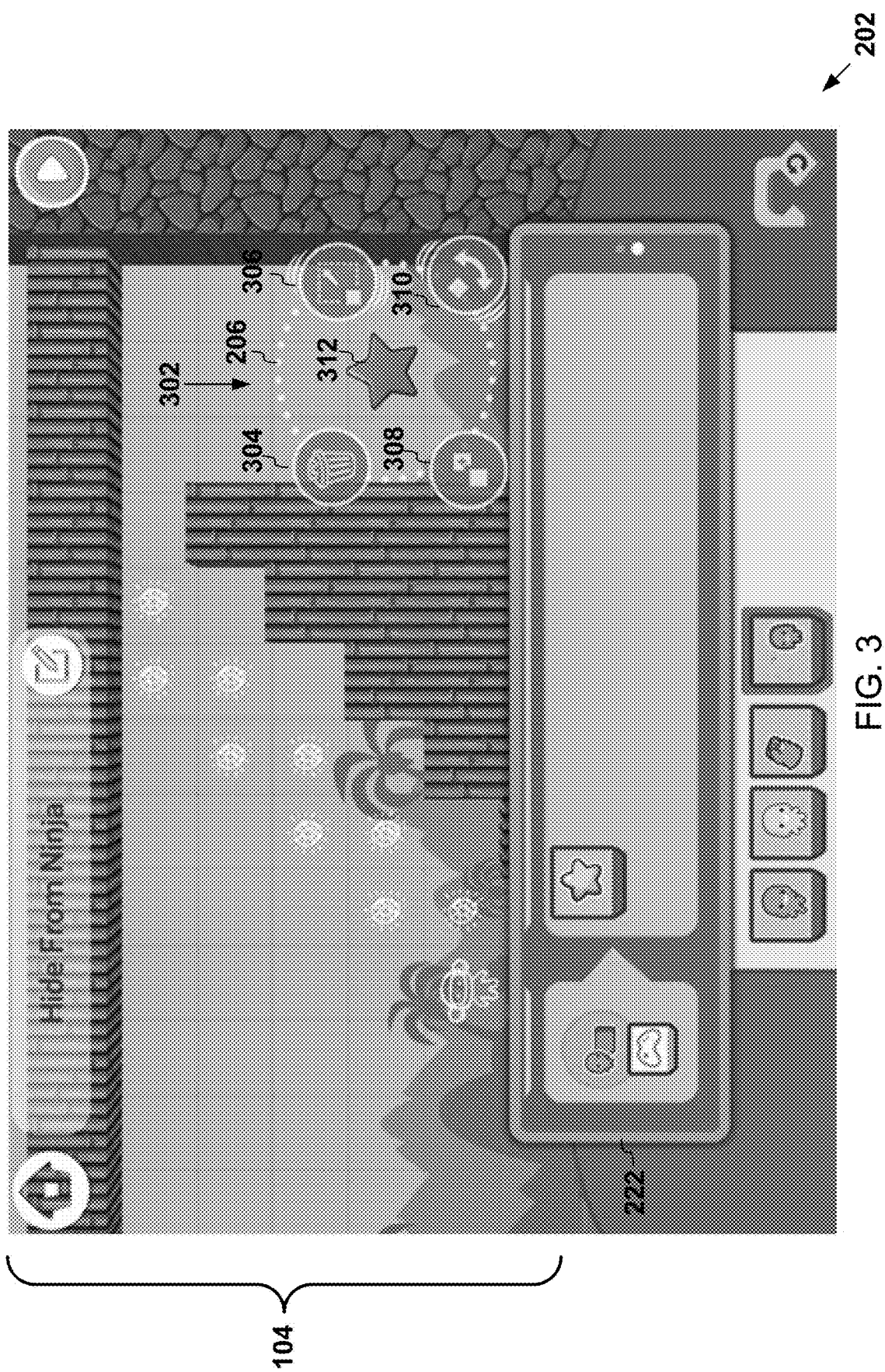
FIG. 3 illustrates an example of an object editor.

The word-free code editor may provide an object editor in some examples. FIG. 3 illustrates an example of an object editor 302. The object editor 302 allows the user to edit the selected item 206. For example, the object editor 302 may include user interface controls 304, 306, 308, and 310 that graphically depict operations the controls 304, 306, 308, and 310 perform on the selected item 206. For example, the controls 304, 306, 308, and 310 may permit the user to delete, scale (up or down), duplicate, and rotate, respectively, the selected item 206. In the example shown in FIG. 3, the selected item 206 is a gold star 312. When the character comes into contact with the gold star 312 when the game is being played, then the level 104 may complete. As described above, the software code associated with the selected item 206 may be displayed in the code editor field 222 of the GUI 202.

The word-free code editor may be considered word-free if no words are needed in order for the user to understand how to program a selected object. In other words, the programming constructs are visually distinguishable from each other and each programming construct has a corresponding visual indicator that indicates the respective programming construct's meaning. The visual indicator may be an icon, an animated icon, an image, or any other indication of the respective programming construct's meaning. Although no words are needed in order for the user to understand how to program a selected object, the word-free code editor may additional include words and still be considered a word-free code editor.

Figure 4:
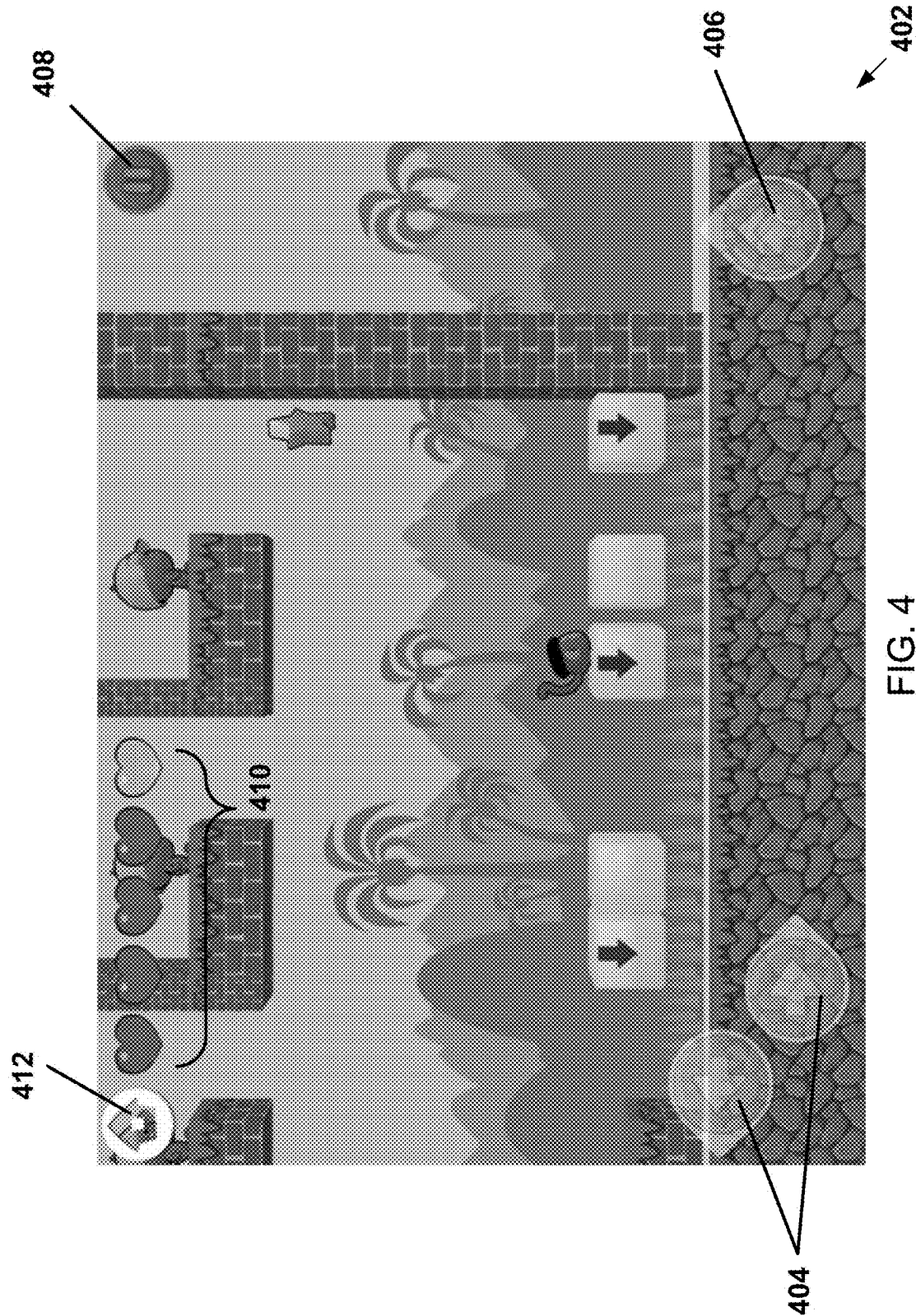
FIG. 4 illustrates an example of a graphical user interface of the video game as the video game is played.

FIG. 4 illustrates an example of a graphical user interface (GUI) 402 of the video game as the video game is played. The game GUI 402 may include input controls such as horizontal movement controls 404, a jump button 406, a pause button 408, and a home button 412. The game GUI 402 may include a health meter 410 that shows how much health the character currently possesses.

The home button 412, if pressed, may cause the system to exit the edit mode and return to a previous screen. The pause button 408, when pressed, may cause the video game to pause and/or cause the system to navigate to the level editor GUI 102, the code editor GUI 202, or some other graphical user interface.

The jump button 406, if pressed, may cause the character to jump. The jump may be a single jump or a double jump depending, for example, on the timing or length of time that the jump button 406 is pressed. The horizontal movement controls 404, if clicked, may move the character left or right, respectively.

Figure 5:
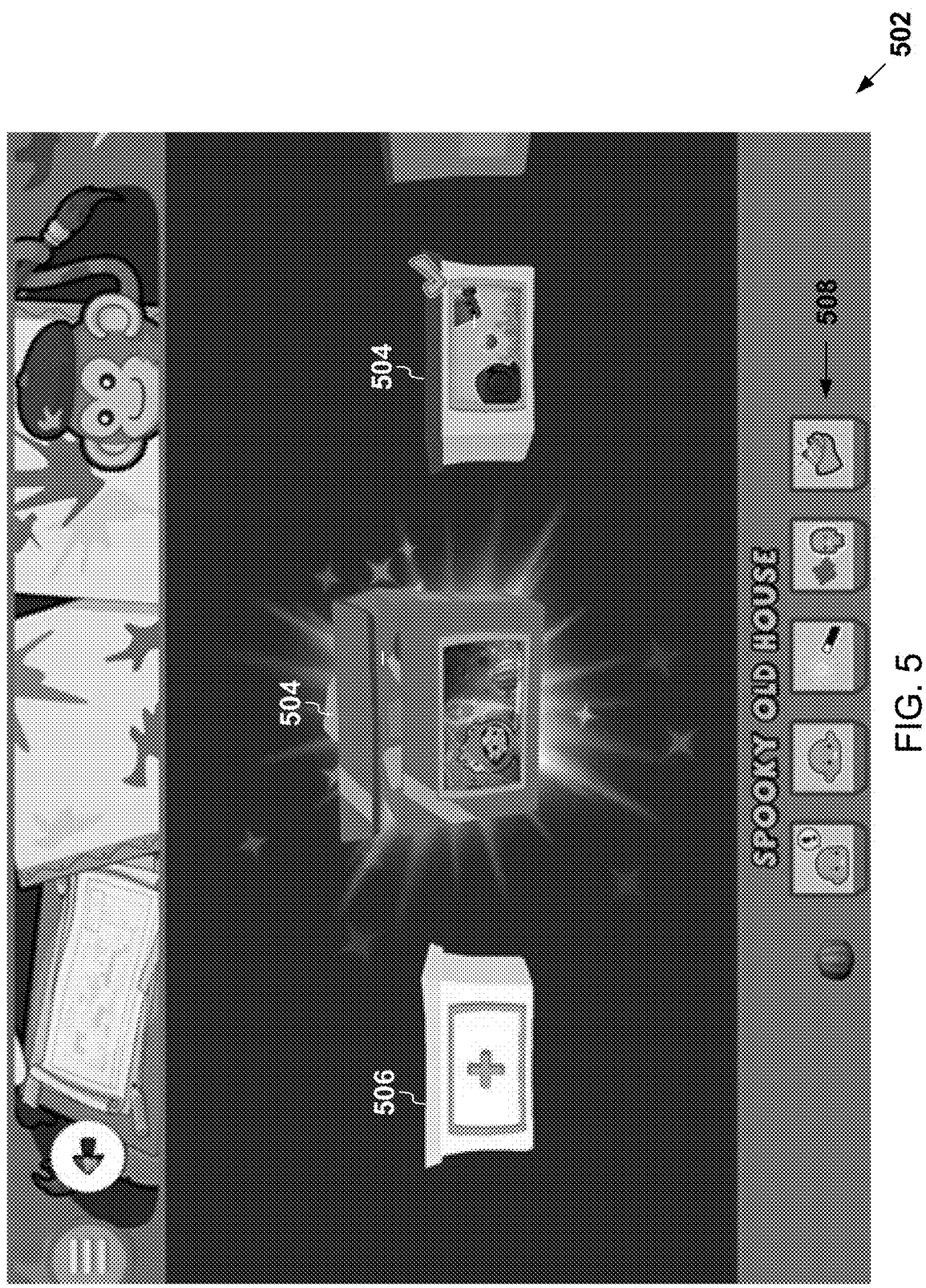
FIG. 5 illustrates an example of a graphical user interface for selecting game kits and/or a blank game template.

FIG. 5 illustrates an example of a graphical user interface (GUI) 502 for selecting game kits 504 and/or a blank game template 506. Each of the game kits 504 may be a template game. If one of the game kits is selected, like in the example illustrated in FIG. 5, then commands 508 that will be used in a game created with the selected game kit may be displayed in the game kit selection GUI 502.

Figure 6:
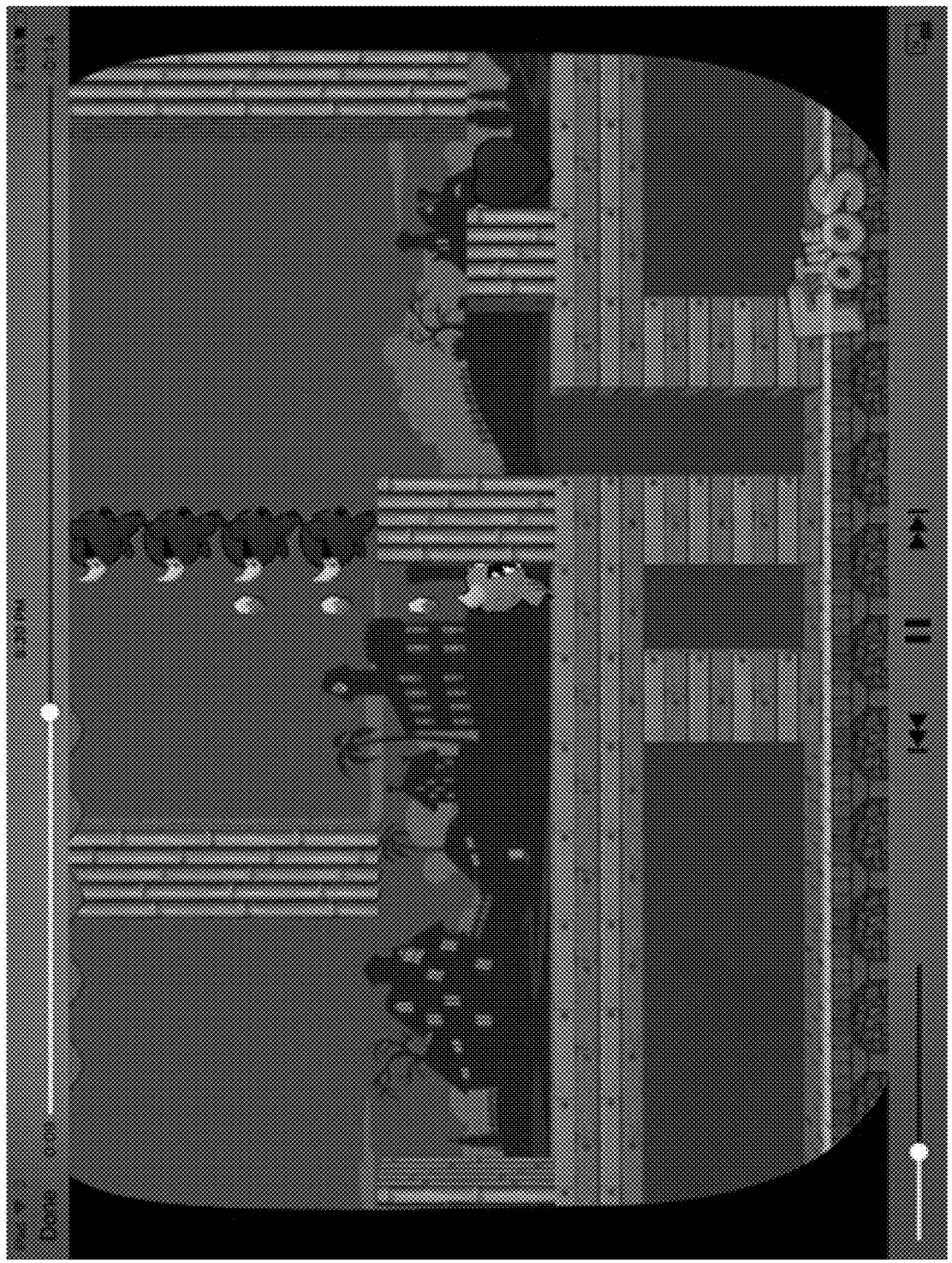
FIG. 6 illustrates a screenshot of a video for a game kit.

After a game kit is selected, a video may be selected by the user—or automatically played—that shows the user what may be built with the selected game kit. FIG. 6 illustrates a screenshot of one such video. Such a video may help the user understand what the user may build with the selected game kit and how the code in the selected game kit works.

Figure 7:
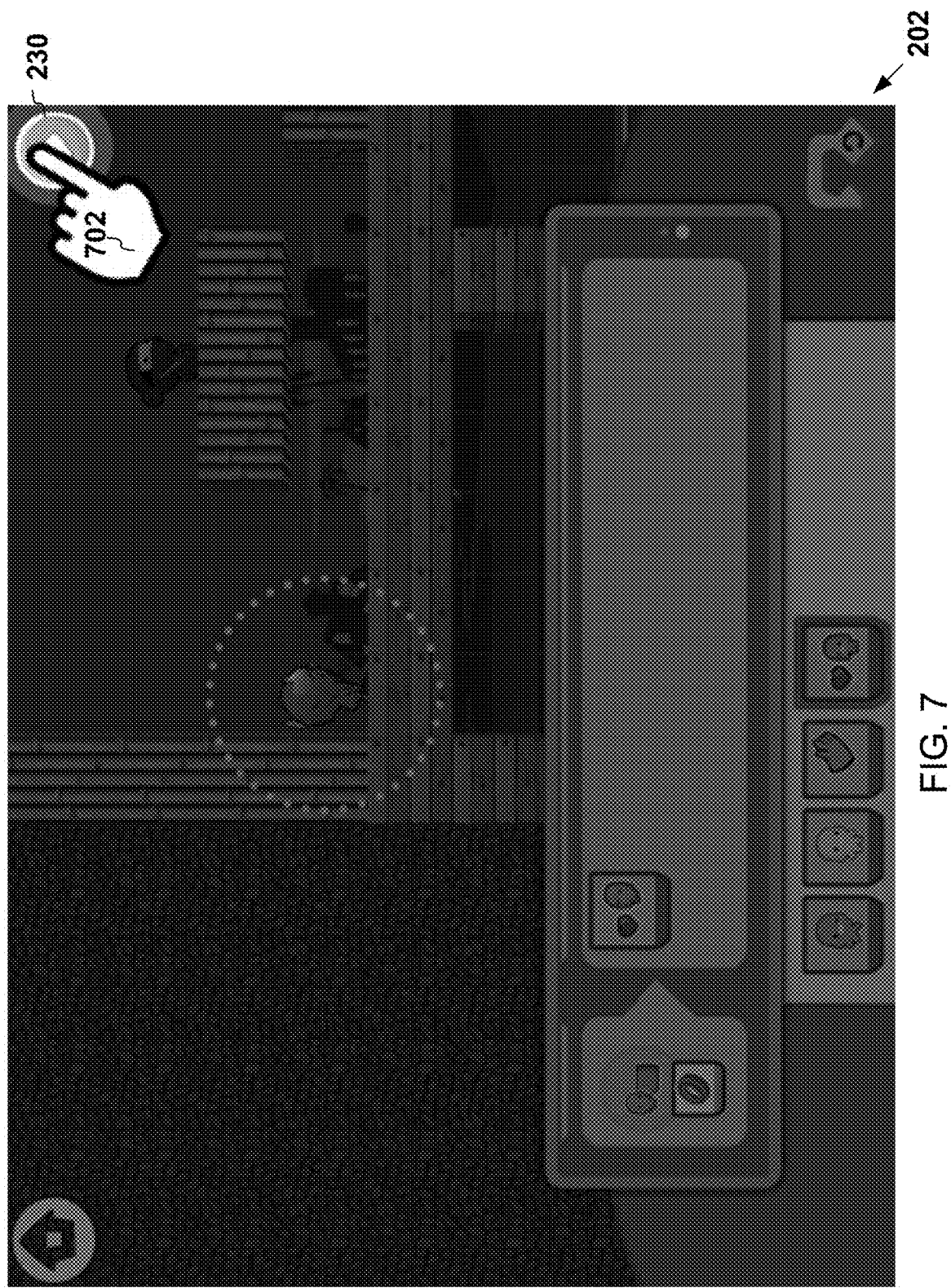
FIG. 7 illustrates an example of an animated helping hand.
Figure 8:
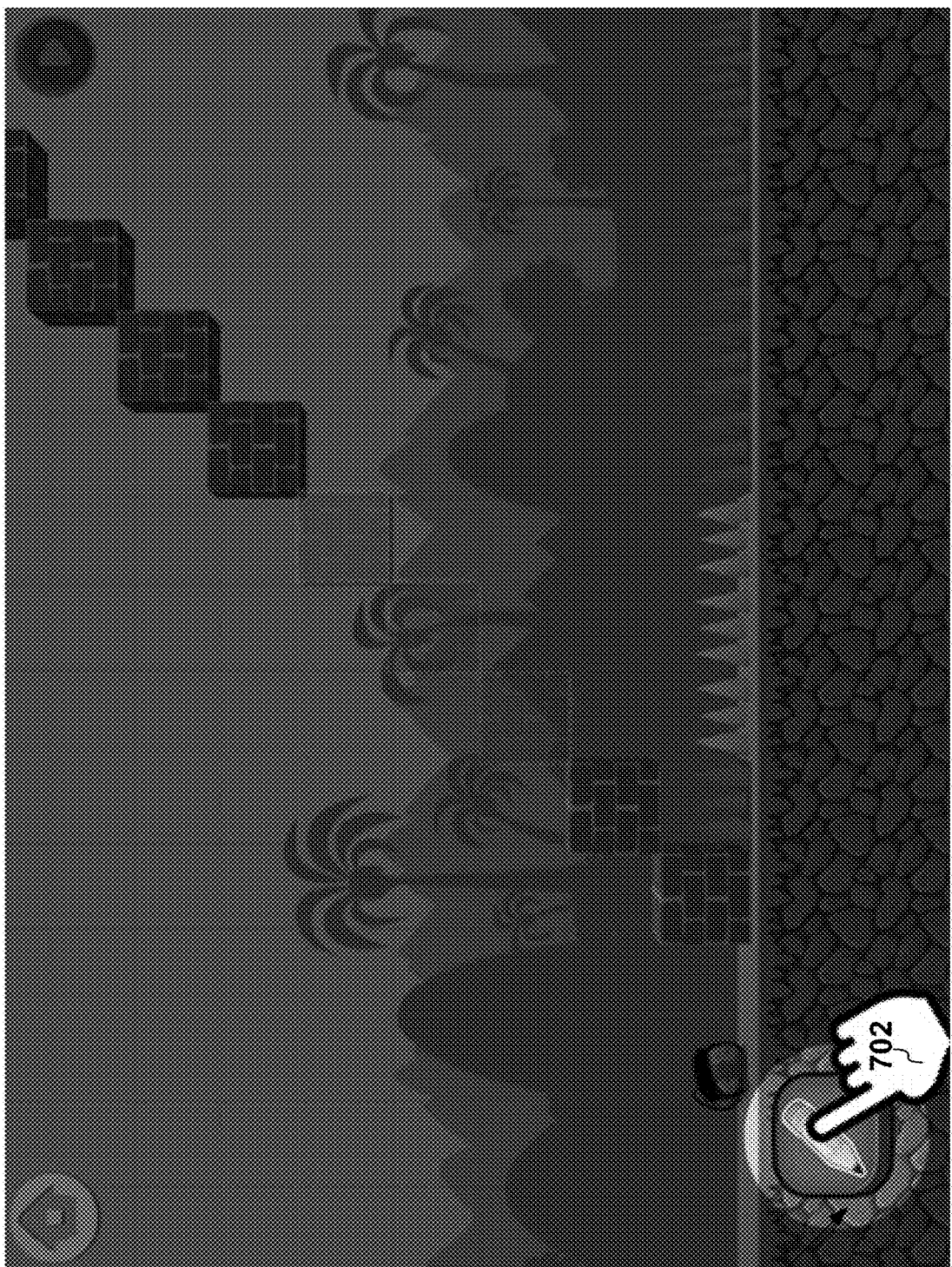
FIG. 8 illustrates an animated helping hand combined with a spotlight effect.

FIG. 7 illustrates an example of an animated helping hand 702. The word-free code editor and/or the level editor may visually show the user what to do by animating the helping hand 702. For example, in FIG. 7 the helping hand 702 is animated to show the hand 702 pressing the play button 230, thereby instructing the user to do the same. Alternatively or in addition, the helping hand 702 may be used to show drag and drop commands. For example, the helping hand 702 may mimic a press action, then slide position across the GUI 202, and final mimic a release action. Accordingly, the helping hand 702 may indicates to the user where and how to make a drag and drop command. The word-free code editor and/or the level editor may visually show the user what to by animating the helping hand 702 at key times and/or if the user requests help. As shown in FIG. 8, the helping hand 702 may be combined with a spotlight effect 802 in some examples in order to make it easier for the user to understand what the helping hand 702 is showing the user to do. Alternatively or in addition, the spotlight effect 802 may resize to enclose one or more elements and move across the GUI 202.

The system for video game development may have an innovative combination of features that enables kids as young as 4 years old to develop video games without help from a teacher or a parent. Never before has there been a tool that combines, for example, a word-free drag and drop coding interface, age appropriate tutorial levels, and a block-based code editor that enables players to change the behavior of game objects.

In addition, the path that the user may follow to develop the video game has been carefully constructed and relentlessly tested in order to move a young user from no knowledge of computer science to eventually building sophisticated games with many different programmed elements.

The system may include a puzzle module in addition to the level editor and word-free code editor. The puzzle module may generate puzzles for the user to solve using programming techniques. The system may provide a seamless progression from puzzles, where key concepts are introduced for the first time to the user. The interface and commands used in the puzzles may be replicated in the word-free code editor and the level editor.

The word-free interface and word-free commands may enable pre-readers and speakers of any language to develop video games. The system may employ animated icons that communicate more meaning than static icons. The system may use animation to communicate both simple and complex ideas. For example, a jump command may be represented by a block having a character that jumps. As another example, a transform command may be represented by a block having an object being turned into another object.

The system may be implemented on a device having a touch screen. Children 9 years or younger may find the touch screen much easier to use than a mouse and a keyboard. The users may not even know how to use a mouse or a keyboard. Navigation choices may be consistently simple and clear to the user. The particular navigation choices were made based on the results of testing with hundreds of children in a target age group of 4 to 10 years old.

The system may also include sounds that are rich and energetic. For example, the system may play music and/or sound effects to help keep kids focused and moving forward on their learning and reinforce the meaning of commands and interactions.

The system may include structured tutorial lessons. The structured tutorial lessons may teach, for example: how to use game controls for controlling the primary character in the video games made by the user and by other children; how to drag and drop programmable objects and decorative stickers into the video game in the level editor; how various commands and events work, how to program objects placed in a game template; how the programming changes the object's behavior; and/or how to use the object editor for scaling, rotating, deleting and copying game objects.

The game kits may be designed to include fun ideas which may be useful for creating gameplay. For example, a game kit may include setting up a spring or a trampoline that helps the character get to an otherwise out-of-reach platform or object.

The game kits may teach, for example: transference (where children use concepts learned earlier from puzzles in a new context); game design fundamentals such as goals (what is the player trying to accomplish?), game objects (what obstacles are in the players way and/or what can help the player?), and how to program interesting object interactions (for example, in one example game kit, an enemy is programmed to drop dynamite if touched and, in another example, blocks are programmed to disappear if jumped on); and/or the concept of an object class (for an object class, if one game object is programmed, then all objects of that type in the game are also automatically programmed the same way). Blank templates may enable the user to create his or her masterpieces or challenges from scratch.

The system for video game development may include an incentive system. For example, the puzzles, the game kits, and/or the tutorial levels may be connected by the incentive system. The incentive system rewards progress through concepts tied explicitly to a coding curriculum. Successful completion of puzzles earns the user, for example, an encouraging dance from a character and/or a currency (such as coins) that may be used to purchase items for building games. Completing each game kit may earn the user, for example, more of the currency and/or unlock additional coding commands. In some examples, the user may earn more of the currency by playing video games created by other users. Alternatively or in addition, the user may earn more currency if other users play the games the user created. The system for video game development may provide positive reinforcement, encouraging kids to master new concepts and persist even when concepts become especially challenging.

To avoid overwhelming young and/or new software developers, the game objects, the commands, and/or other game creator elements may be unlocked and added to the inventory 106 over time. In addition, the user may have to make choices about what game objects and commands the user wants when purchasing them with the currency earned by the user. Accordingly, the system for video game development enables the number of objects and commands available to the user in the inventory 106 to grow with the progress of each user. The system for video game development may provide puzzles and game kits designed to provide instructional scaffolding for learning to program. In other words, the learning takes place in the user's zone of proximal development. The system selects the next puzzle and/or game kit to match the user's current level of knowledge and expand the content just beyond the user's current level of knowledge. Alternatively or in addition, as the user's knowledge level increases through solving puzzles and/or completing game kits, the amount of support and guidance provided to the user—such as the helping hand 702—may decrease.

The system for video game development may include a community system in some examples. The community system may provide each user access to a global community of creators. When using the community system, the user may remix video games made by other users. When video games are remixed, the user remixing the video game may see how each element of that game was programmed. Alternatively or in addition, when using the community system, the user may provide feedback on video games created by other users and receive feedback on video games created by the user and shared with others. The user may also potentially find inspiration by playing games created by other users. The system enables users across languages or prereaders to meaningfully share code with each other. The system may also enable game levels to be shared and then be remixed by other users.

Figure 9:
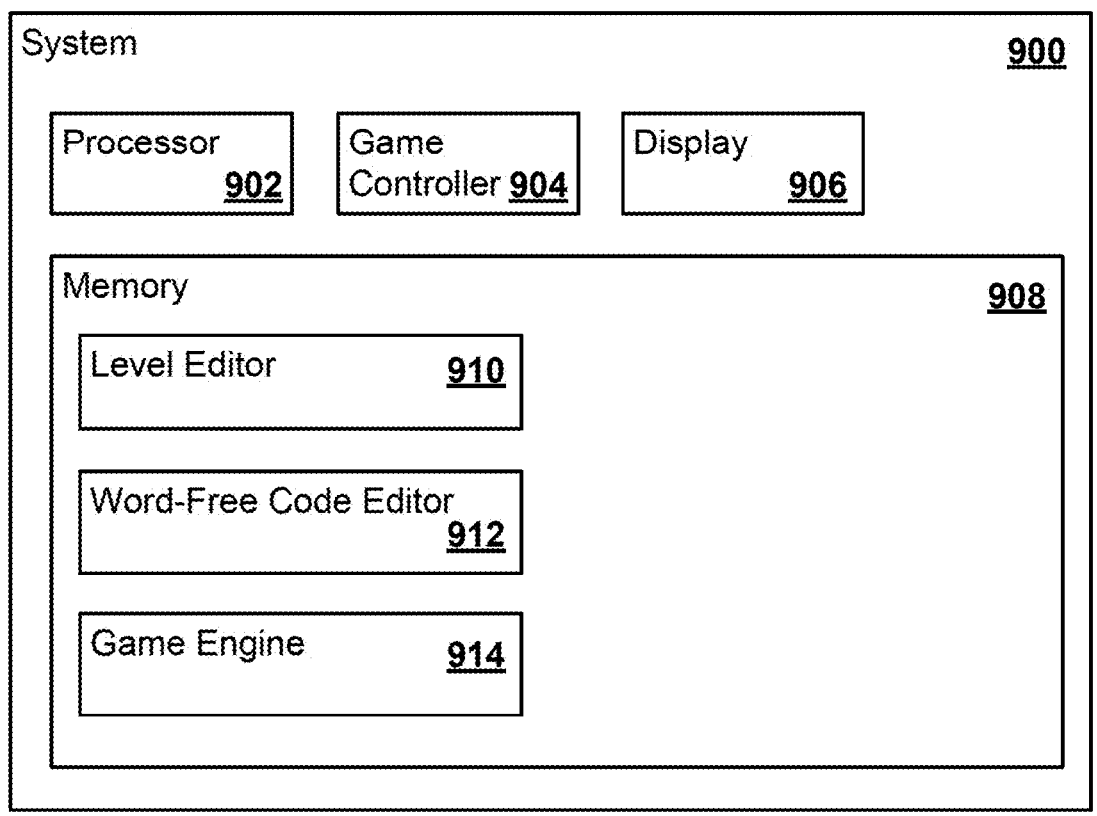
FIG. 9 illustrates an example of a system for video game development.

FIG. 9 illustrates an example of a system 900 for video game development. The system 900 may include a processor 902, a game controller 904, a display 906, and a memory 908. The system 900 may include additional, fewer, or different components. For example, the system 900 may also include a user input device (not shown), such as a keyboard and a mouse, for receiving user input. The user input device may be any electro-mechanical device, electro-optical device, or any other type of device that is configured to convert user inputs into electrical signals such as a gyroscope, an accelerometer, a gesture input, a mouse, a joystick, a trackball, a camera, a keyboard, a keypad, a wireless device, a microphone for voice commands, a scroll wheel, a button, and a touch-screen display.

The game controller 904 may be any user input device. Examples of the game controller 904 include a gyroscope, an accelerometer, a gesture input, a joystick, a racing wheel, a flight controller, a game pad, a gaming mouse, a keyboard, a keypad, a touch screen, an optical mouse, or any other type of device to receive user input during game play.

In some examples, the system 900 may include a touch screen (not shown) that may be integrated with the display 906. The game controller 904 and the input device may be—or be included in—the touch screen. For example, a portion of the touch screen may be located where a user interface object is displayed and the portion of the touch screen together with the user interface object may operate as the game controller 904. In some examples, the system 900 may include a communications interface (not shown), such as a wireless or wired networking component configured to communicate over a network (not shown).

The system 900 may include one or more devices. For example, all of the components illustrated in FIG. 9 except for the game controller 904 may be included in a single computing device, such as a tablet, a smart phone, a laptop, or an embedded device, but the game controller 904 may be a separate and discrete device in communication with the computing device. In an alternative example, the system 900 may be entirely included in a single computing device.

The processor 902 may be in communication with the memory 908. The processor 902 may be, in some examples, in communication with additional elements such as the display 906 and the game controller 904. Examples of the processor 902 may include a general processor, a central processing unit, a microcontroller, a server, an application specific integrated circuit (ASIC), a digital signal processor, a field programmable gate array (FPGA), a digital circuit, and/or an analog circuit.

The processor 902 may be one or more devices operable to execute logic. The logic may include computer executable instructions or computer code embodied in the memory 908 or in other memory that when executed by the processor 902, cause the processor 902 to perform the features implemented by the logic. The computer code may include instructions executable with the processor 902.

The memory 908 may be any device for storing and retrieving data or any combination thereof. The memory 908 may include non-volatile and/or volatile memory. Examples of the memory 908 may include a random access memory (RAM), a read-only memory (ROM), an erasable programmable read-only memory (EPROM), and a flash memory. Alternatively or in addition, the memory 908 may include an optical, magnetic (hard-drive) or any other form of data storage device.

The memory 908 may include a level editor 910, a word-free code editor 912, and a game engine 914. The level editor 910 may configure the level 104 of a video game in response to user input via the level editor GUI 102 as described herein. Examples of the user input may include drag and drop gestures, taps, double-taps, mouse clicks, key pressing, and/or any other type of user input. The word-free code editor 912 may generate software code in response to user input via the code editor GUI 202 as described herein. Examples of the user input may include drag and drop gestures, taps, double-taps, mouse clicks, key pressing, and/or any other type of user input. The game engine 914, when the video game is played, may move the character 204 within the level 104 in response to the input received from the game controller 904, control the game objects according to the generated software code, and complete the level when the objective for the character is met as described herein. Although the level editor 910, the word-free code editor 912, and the game engine 914 are listed separately, in some examples, the game engine 914 may include the level editor 910 and/or the word-free code editor 912.

Each component of the system 900 may include additional, different, or fewer components. For example, the memory 908 may include an incentive system (not shown), a puzzle module (not shown), a game kit module (not shown), and/or a community system (not shown). The incentive system may operate as described herein. The puzzle module may enable the user to solve programmatic puzzles as described herein. The game kit module may generate the game kit GUI 502 and thereby enable the user to select from among the game kits 504 as described herein. The community system may operate as described herein.

The system 900 may be implemented in many different ways. Each module, such as the level editor 910, the word-free code editor 912, and the game engine 914, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 908, for example, that comprises instructions executable with the processor 902 or other processor to implement one or more of the features of the module. When any one of the module includes the portion of the memory that comprises instructions executable with the processor, the module may or may not include the processor. In some examples, each module may just be the portion of the memory 902 or other physical memory that comprises instructions executable with the processor 902 or other processor to implement the features of the corresponding module without the module including any other hardware. Because each module includes at least some hardware even when the included hardware comprises software, each module may be interchangeably referred to as a hardware module.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device. However, the computer readable storage medium is not a transitory transmission medium for propagating signals.

The processing capability of the system 900 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

Figure 10:
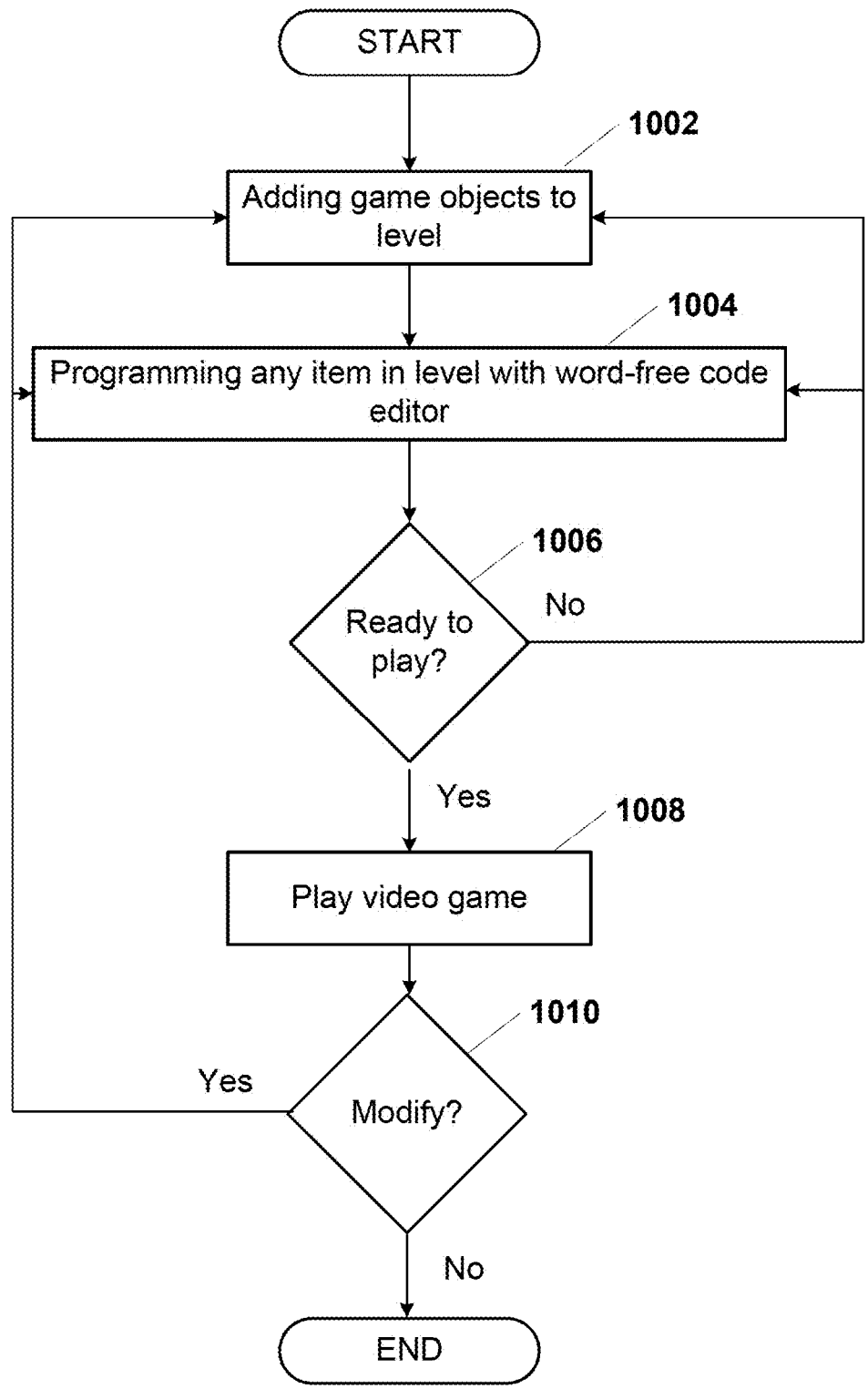
FIG. 10 illustrates an example flow diagram of the logic of the system.

FIG. 10 illustrates an example flow diagram of the logic of the system 900. The logic may include additional, different, or fewer operations. The operations may be executed in a different order than illustrated in FIG. 10.

Game objects may be added (1002) to the level 104 of a video game by dragging visual indications of the game objects from an inventory section of a level editor GUI to locations in the level.

Any item in the level may be programmed (1004) with the word-free code editor.

If the user is ready to play the video game, then the game engine may cause (1008) the video game to be played. Alternatively, if not, then operations may return to adding (1002) game object to the level and/or programming (1004) items in the level with the word-free code editor.

After the video game is played (1008), the system 900 may provide the user with an opportunity to make additional changes to the video game. If further changes are to be made (1010), then operations may return to adding (1002) game object to the level and/or programming (1004) items in the level with the word-free code editor.

The logic illustrated in the flow diagram may include additional, different, or fewer operations than illustrated. The operations illustrated may be performed in an order different than illustrated.

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality are just examples of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A system comprising:
   a game controller;
   a processor;
   a memory comprising:
   a word-free level editor executable by the processor to configure a level of a video game in response to user input, wherein the level represents a physical space comprising game objects, a character is moveable within the physical space in response to input received from the game controller when the video game is played, and the level has an objective for the character to complete;
   a word-free code editor executable by the processor to program any of the game objects of the level with software code, the word-free code editor executable to include the software code in a code editor field of a code editor graphical user interface, the software code comprising an event and a command, the event and the command each having a corresponding visual representation in the code editor field that indicates, without words, a meaning of the event or the command respectively, wherein the command is to be executed if the event occurs when the video game is played; and a game engine configured to, when the video game is played, move the character within the level in response to the input received from the game controller, control the game objects according to the software code, and complete the level when the objective for the character is met.

2. The system of claim 1 wherein the word-free code editor generates an event box and a sequence box in the code editor graphical user interface, wherein the event box visually indicates that any command whose corresponding visual representation is located in the sequence box is executed if the event occurs whose corresponding visual representation is located in the event box.

3. The system of claim 2, wherein a visual representation of a control structure is movable into and/or out of the sequence box, wherein the control structure determines a flow of execution of the software code in the code editor field, and wherein the control structure visually indicates the flow of execution of the software code in the code editor field.

4. The system of claim 3, wherein the visual representation of the control structure encloses the command and indicates a flow of execution of the command.

5. The system of claim 2, wherein the corresponding visual representation of the command is a block that is movable into and/or out of the sequence box.

6. The system of claim 2, wherein content of the event box and the sequence box represents code with which an item selected in the level is programmed.

7. The system of claim 2, wherein an order in which a plurality of commands whose corresponding visual representations are located in the sequence box are executed is indicated by an order in which the corresponding visual representations are located in the sequence box.

8. The system of claim 1 wherein the physical space represented by the level is two-dimensional.

9. The system of claim 1 wherein blueprints in the level comprise outlines of a plurality of suggested game objects, the outlines placed in suggested locations in the level.

10. The system of claim 1 further comprising a touch screen, wherein the game controller is included in the touch screen, wherein the user input to the word-free level editor and the user input to the word-free code editor are received via the touch screen.

11. The system of claim 1, wherein the corresponding visual representation of the command and/or the event includes an animation.

12. A non-transitory computer readable storage medium comprising computer executable instructions, the computer executable instructions executable by a processor, the computer executable instructions comprising:

instructions executable by the processor to configure a level of a video game in response to user input via a word-free level editor, wherein the level represents a physical space comprising game objects, a character is moveable within the physical space in response to input received from a game controller when the video game is played, and the level has an objective for the character to complete;

instructions executable by the processor to implement a word-free code editor through which any selected item in the level is user programmable, the selected item programmable with software code that includes an event and a command, the event and the command each having a corresponding visual representation in a code editor field of a code editor graphical user interface, the corresponding visual representation indicates, without words, a meaning of the event or the command respectively, wherein the command is to be executed if the event occurs when the video game is played; and instructions executable by the processor, when the video game is played, move the character within the level in response to the input received from the game controller, control the programmed item according to the event and the command, and complete the level when the objective for the character is met.

13. The storage medium of claim 12, wherein an event box and a sequence box are located in the code editor graphical user interface, wherein the event box visually indicates that any command whose corresponding visual representation is located in the sequence box is executed if the event occurs whose corresponding visual representation is located in the event box.

14. The storage medium of claim 13, wherein the corresponding visual representation of the command is a block that is movable into and/or out of the sequence box.

15. The storage medium of claim 13, wherein content of the event box and the sequence box represents code with which an item selected in the level is programmed.

16. The storage medium of claim 12 wherein the physical space represented by the level is two-dimensional.

17. The storage medium of claim 12 wherein the game objects in the level may be added or removed to the level by dragging the game objects into or out of the level.

18. The storage medium of claim 12 wherein blueprints in the level comprise outlines of a plurality of suggested game objects, the outlines placed in suggested locations in the level.

19. The storage medium of claim 12 wherein the code editor graphical user interface is displayable on a touch screen, wherein the game controller is included in the touch screen, wherein the user input to the user input to the word-free code editor are receivable via the touch screen.

20. A method of developing a video game, the method comprising:

adding a plurality of game objects to a level of a video game by dragging visual indications of the game objects from an inventory section of a word-free level editor graphical user interface to locations in the level using a touch screen, wherein the level represents a physical space, a character is moveable within the physical space in response to input received from the touch screen when the video game is played, and the level has an objective for the character to complete; and programming any item in the level with a word-free code editor having an event box and a sequence box by selecting the item in the level using the touch screen, dragging a visual indication of a command to the sequence box using the touch screen, wherein the event box visually indicates that any command whose corresponding visual representation is located in the sequence box is executed when an event occurs whose corresponding visual representation is located in the event box, wherein the visual indication of the command indicates, without words, a meaning of the command, and the corresponding visual representation of the event indicates, without words, a meaning of the event, wherein the command is to be executed when the event occurs while the video dame is played; and wherein while the video game is played, the character is moved by a game engine within the level in response to the input received from a game controller, the programmed item behaves according to the event and the command, and the level is completed when the objective for the character is met.

\* \* \* \* \*